US012692960B2

(12) United States Patent
Ifrim

(10) Patent No.: US 12,692,960 B2
(45) Date of Patent: Jul. 28, 2026

(54) MITIGATION OF VIBRATION IN PIPE SYSTEMS

(71) Applicant: The Boeing Company, Arlington, VA (US)

(72) Inventor: Alin Ifrim, Surprise, AZ (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/619,715

(22) Filed: Mar. 28, 2024

(65) Prior Publication Data

US 2025/0305608 A1 Oct. 2, 2025

(51) Int. Cl.
F16L 55/04 (2006.01)
F16L 27/11 (2006.01)

(52) U.S. Cl.
CPC ............. F16L 27/11 (2013.01); F16L 55/041 (2013.01)

(58) Field of Classification Search
CPC ....... F16L 51/026; F16L 55/04; F16L 55/041; F16L 37/091; F16L 37/0915; F15D 1/02
See application file for complete search history.

(56) References Cited

U.S. PATENT DOCUMENTS

| | | | | |
|---|---|---|---|---|
| 3,861,721 A | * | 1/1975 | Berghofer | ............. F16L 51/024 |
| 5,901,754 A | * | 5/1999 | Elsasser | ................ F16L 51/027 |
| 5,992,465 A | * | 11/1999 | Jansen | ....................... F15D 1/02 |
| 8,727,667 B2 | | 5/2014 | West et al. | |
| 9,188,245 B2 | | 11/2015 | Allen et al. | |
| 9,511,825 B1 | | 12/2016 | Henning et al. | |
| 2015/0308595 A1 | * | 10/2015 | Lee | ........................ F16L 37/091 |
| 2019/0331274 A1 | * | 10/2019 | Quesada | ............... F16L 37/091 |

* cited by examiner

*Primary Examiner* — Zachary T Dragicevich
(74) *Attorney, Agent, or Firm* — Harrity & Harrity, LLP

(57) ABSTRACT

A liquid flow-induced vibration suppression device, system, and method are disclosed. In an embodiment, the device is a mounting ring or hoop to which fin-shaped strakes are secured. The hoop is affixable to an interior wall of a first pipe positioned upstream of, and connected by a flexible joint to, a second pipe. The strakes are angled inwardly from the interior wall, and are positioned adjacent to an interface of the first pipe and the flexible joint. In one fluid dynamics modeled example involving rocket motor thrust vectoring, liquid fuel is conveyed in 16-inch diameter pipes at cryogenic temperatures. The strakes are one inch long, spaced apart approximately 0.1 inch, and extend radially from the interior wall in a 10-to-30-degree angle range. The device is brazed to the interior wall of the first pipe, and can be formed of INCONEL® or titanium alloy to optimize fatigue life.

22 Claims, 7 Drawing Sheets

FIG. 6

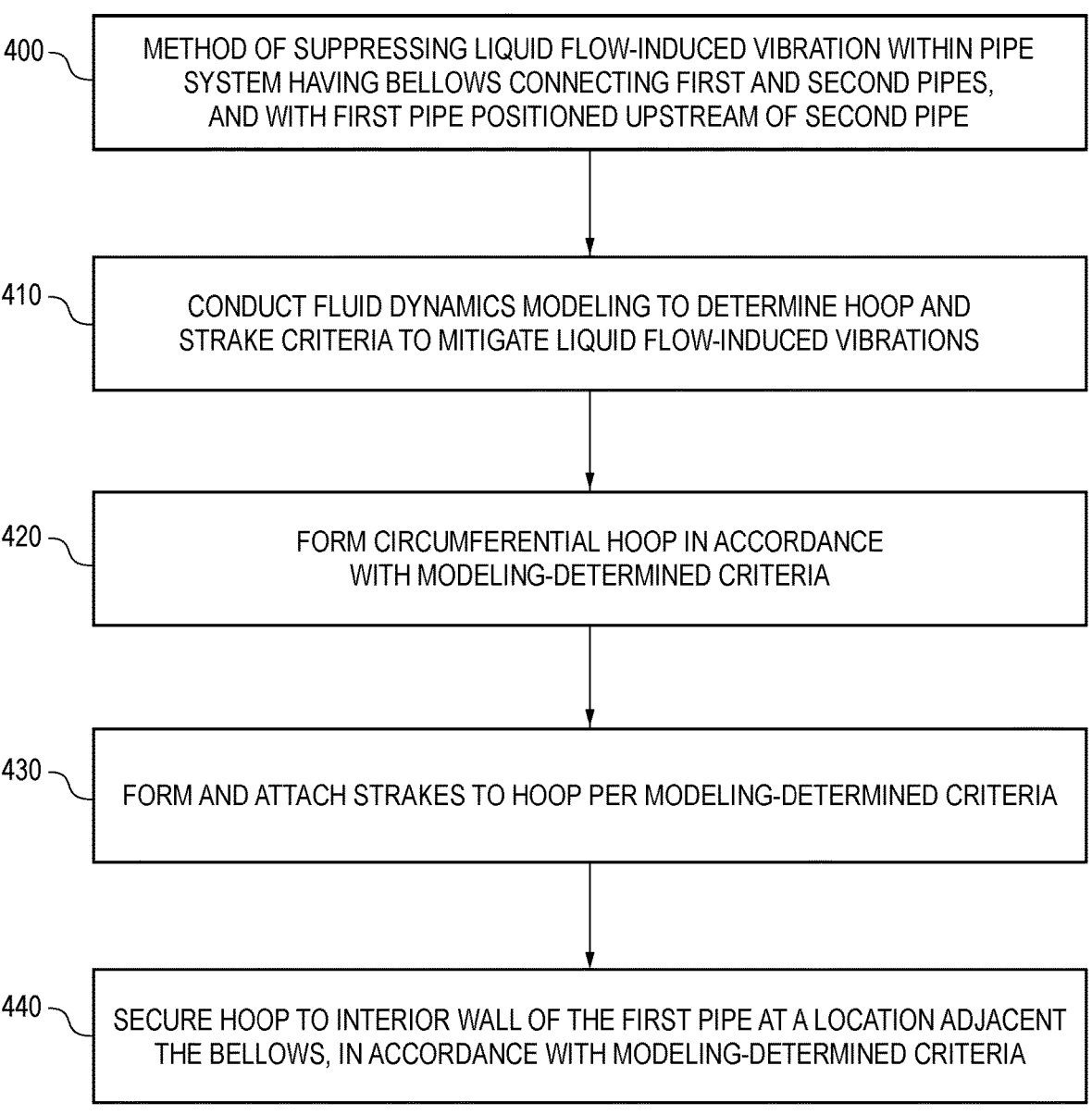

400 — METHOD OF SUPPRESSING LIQUID FLOW-INDUCED VIBRATION WITHIN PIPE SYSTEM HAVING BELLOWS CONNECTING FIRST AND SECOND PIPES, AND WITH FIRST PIPE POSITIONED UPSTREAM OF SECOND PIPE

410 — CONDUCT FLUID DYNAMICS MODELING TO DETERMINE HOOP AND STRAKE CRITERIA TO MITIGATE LIQUID FLOW-INDUCED VIBRATIONS

420 — FORM CIRCUMFERENTIAL HOOP IN ACCORDANCE WITH MODELING-DETERMINED CRITERIA

430 — FORM AND ATTACH STRAKES TO HOOP PER MODELING-DETERMINED CRITERIA

440 — SECURE HOOP TO INTERIOR WALL OF THE FIRST PIPE AT A LOCATION ADJACENT THE BELLOWS, IN ACCORDANCE WITH MODELING-DETERMINED CRITERIA

MITIGATION OF VIBRATION IN PIPE SYSTEMS

TECHNICAL FIELD

The present disclosure relates to vibration suppression, and particularly to suppressing liquid flow-induced vibration resonance that occurs within pipes. More particularly, the disclosure relates to devices, systems, and methods for mitigating such vibrations when induced by the flow of liquids through flexible joints in pipe systems.

BACKGROUND

Flexible joints are utilized to permit at least limited movements within pipe systems. For example, bellows are employed to allow an amount of lateral and/or angular flexibility in otherwise rigid pipe systems. The bellows are formed of corrugated annular members secured to pipe ends in a variety of ways, including clamping, brazing and/or welding. Beyond land-based examples of pipe system flexibility, pipe systems that supply liquid fuel to aerospace rocket motors must be designed to swivel on gimbals to accommodate thrust vectoring of exhaust nozzles for directional control.

For such purposes, bellows are used to connect the ends of rocket fuel-carrying pipe sections associated with gimbal movements. To manage fuel flows within connected pipe sections, the bellows can be formed of a variety of specialized materials such as superalloy metals in order to meet performance requirements. Unlike the smooth interiors of the pipes to which they are connected, the bellows are designed with convolutions that define undulations, or gaps, by which flows of liquid fuel can be disturbed. Thus, as liquid flows over the undulations within the bellows, a vortex shedding phenomena can create pulsing vibrations, which can resonate though an entire pipe system.

Liquid flow-induced vibrations within pipe systems result in reduced fluid flow rates, system performance degradation, and even occasional system failures. Vibration issues have been particularly problematic for rocket fuel lines, as existing solutions have principally involved limiting fuel flow velocities through the affected lines. As such, vibration resonance issues have impeded abilities of designers to reach target objectives.

Against such backdrop, a solution is desired for effective liquid flow-induced vibration mitigation within pipe systems that include bellows. Also desired are opportunities for increasing fluid flow rates in rocket fuel lines.

SUMMARY

In accordance with one aspect of the present disclosure, a vibration suppression device reduces liquid flow-induced vibration within a pipe system. The pipe system includes at least one flexible joint connecting a first pipe to a second pipe, and the device includes a circumferential hoop affixable to an interior wall of the first pipe, upstream of the bellows. A plurality of spaced fin-shaped strakes are attached to the hoop, configured to extend downstream of the hoop adjacent to the flexible joint, and are oriented radially inwardly from the interior wall of the first pipe.

In accordance with another aspect of the present disclosure, a vibration suppression system reduces liquid flow-induced vibration. The system includes at least one flexible joint connecting a first pipe to a second pipe, and is configured for conveyance of liquid flow through the flexible joint from the first pipe. A circumferential hoop is affixed to an interior wall of the first pipe adjacent to and upstream of the flexible joint. A plurality of spaced fin-shaped strakes are attached to the hoop, with the strakes extending downstream of the hoop, and oriented radially inwardly from the interior wall of the first pipe.

In accordance with yet another aspect of the present disclosure, a method of suppressing liquid flow-induced vibration within at least a first pipe, a second pipe, and a bellows connecting the first pipe to the second pipe includes conducting fluid dynamics modeling. Modeling elements include the bellows, as well as the first pipe and the second pipe, both of a predetermined diameter. The first pipe is an upstream pipe configured to flow liquid through the bellows and into the second pipe. The modeling also includes elements of a hoop and plurality of strakes attached to the hoop. As such the modeling can be conducted for determining optimal hoop and strake criteria for mitigating liquid flow-induced vibrations within the first pipe, the second pipe, and the bellows. The method further includes forming the hoop in accordance with modeling-determined criteria, including hoop thickness; forming and attaching a plurality of modeling-determined geometrically sized and angled strakes to the hoop; and securing the hoop to an interior wall of the first pipe in a location adjacent to and upstream of the bellows, in accordance with modeling-determined criteria.

The features, functions, and advantages disclosed herein can be achieved independently in various embodiments or may be combined in yet other embodiments, the details of which may be appreciated with reference to the following description and drawings.

BRIEF DESCRIPTION OF THE DRAWINGS

FIG. 6 is a Flowchart of an exemplary method of conducting fluid dynamics modeling to create an embodiment of a vibration suppression system.

The referenced drawings are not necessarily to scale, and any disclosed embodiments are illustrated only schematically. Aspects of any of the disclosed embodiments may be combined with or substituted by one another, and within various systems and environments that are neither shown nor described herein. As such, the following detailed description is merely exemplary, and not intended to be limiting in either its application or use.

DESCRIPTION

This description addresses an apparatus, a system, and a method for conducting the present disclosure. Actual scope of the disclosure is as defined in the appended claims.

As those skilled in the art may appreciate, this disclosure may contain references to specific apparatus and/or characteristics of apparatus, including devices, systems, and methods, that may appear to be limiting. However, and as just as one example, any and all references to pipes, are intended herein to more broadly include tubes, hoses, and other structures that may convey liquids.

Figure 1:
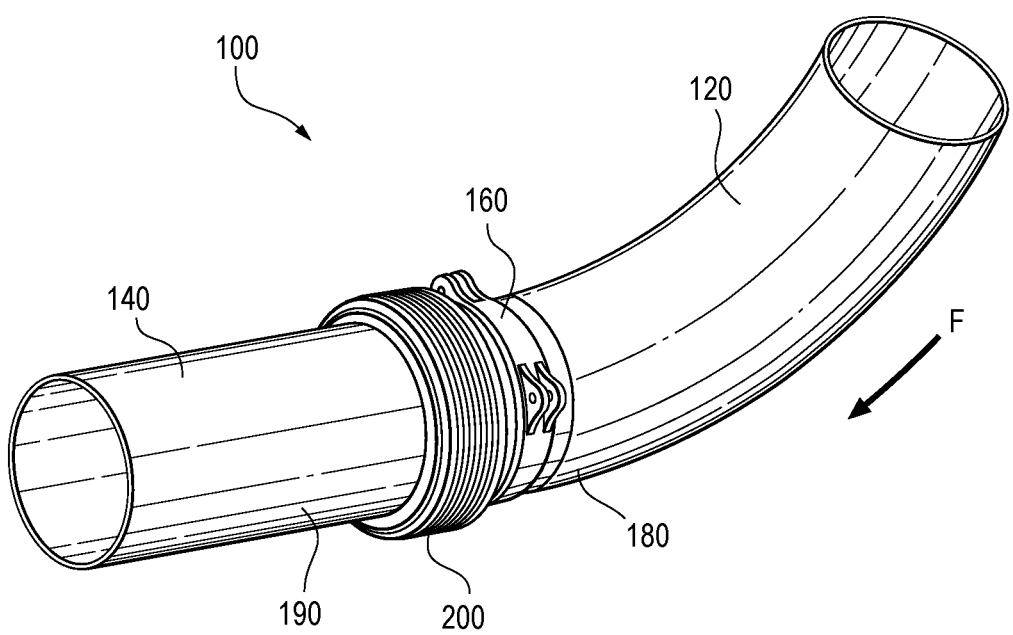
FIG. 1 is a perspective view of an exemplary embodiment of a vibration suppression system that may be employed in accordance with the present disclosure.

Referring initially to FIG. 1, an exemplary vibration suppression system 100 is disclosed. A pair of pipes, reflective of only a portion of a larger pipe system (not shown), are connected together by a flexible joint. Thus, the vibration suppression system 100 includes at least a first pipe 120 and a second pipe 140, and a flexible joint, such as a bellows 200, the latter providing a secure fluid connection between connection ends 180 and 190, respectively, of the first pipe 120, and the second pipe 140.

Figure 2A:
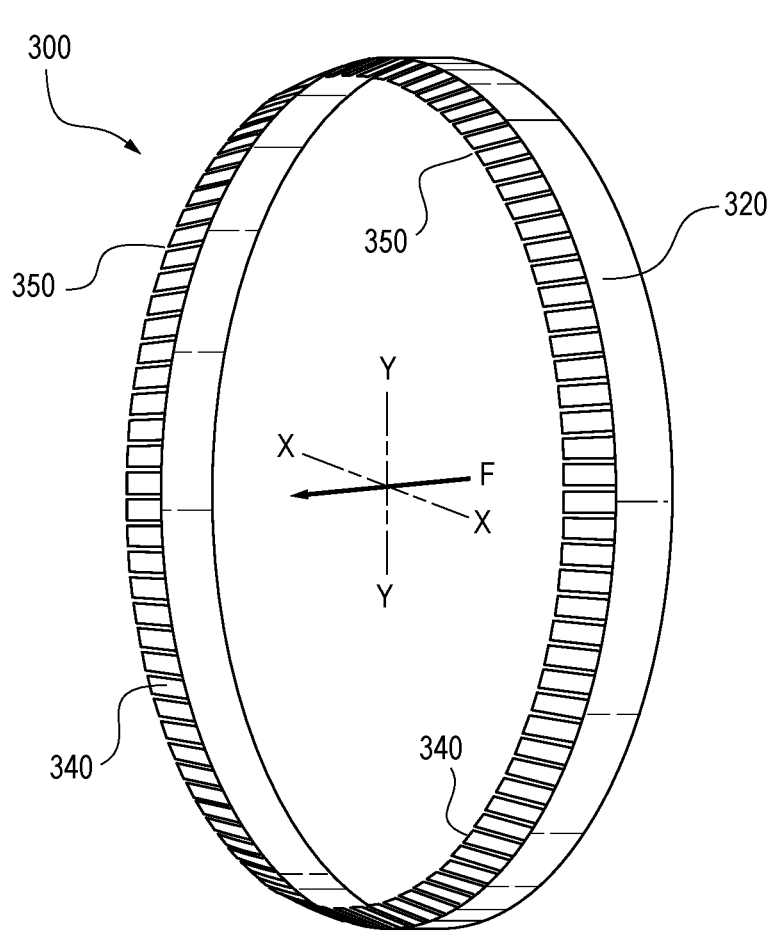
FIG. 2A is a perspective view of an exemplary embodiment of a vibration suppression device that may be fabricated and employed in accordance with the present disclosure.
Figure 2B:
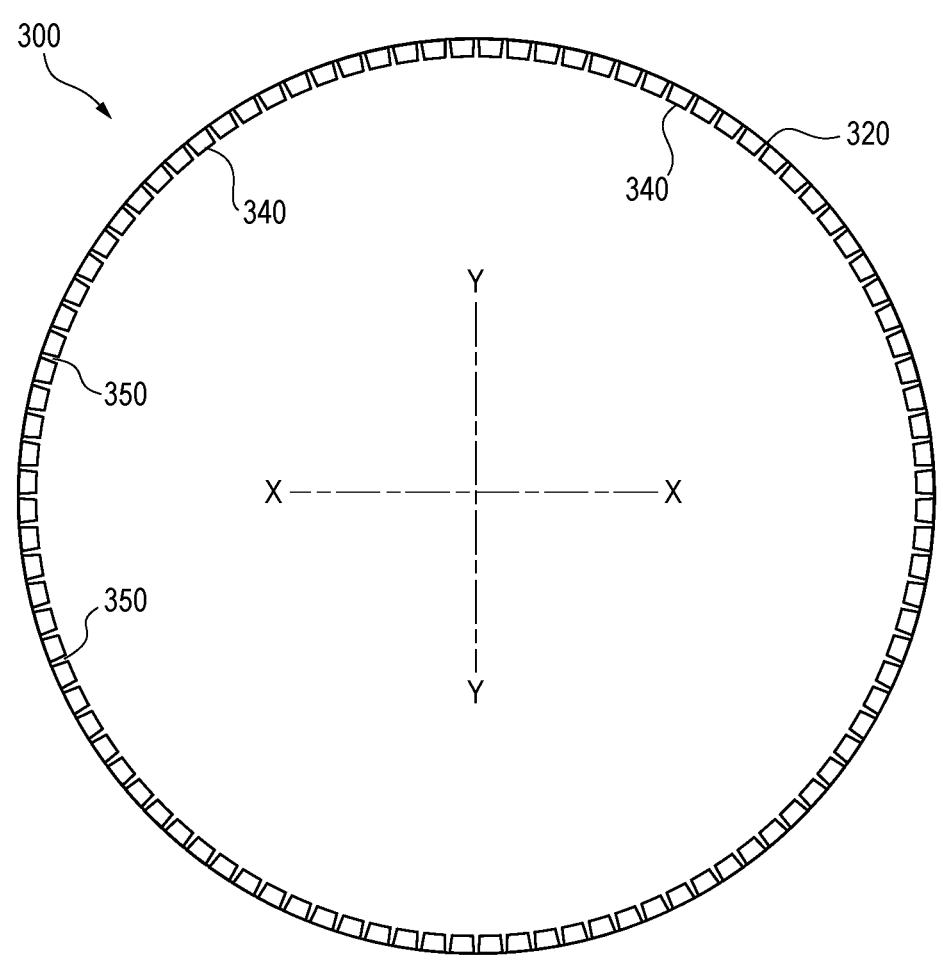
FIG. 2B is a plan view of the exemplary embodiment of FIG. 2A.

FIGS. 2A and 2B display an exemplary vibration suppression device 300 configured to be positioned at the interface of the connection end 180 of the first pipe 120, adjacent to and upstream of the bellows 200. The device 300 consists of a mounting ring, herein referenced as a hoop 320. The hoop 320 has a diameter sized for securement to an interior wall 122 of the first pipe 120, or to a separate structure of the bellows 200, as described below. A plurality of circumferentially spaced fin-shaped strakes 340 extend from the hoop 320 at an angle as further described herein. In the embodiment shown, the hoop 320 and strakes 340 are formed of a unitary structure, such as from a single metal stamping. Alternatively, the strakes 340 may also be formed separately and bonded to the hoop 320, as are alternate embodiments described herein.

Continuing reference to FIGS. 2A and 2B, the strakes 340 are spaced apart circumferentially about the hoop 320, separated by gaps 350 between each of the individual strakes 340. The strakes are configured to extend from the hoop 320 in the direction of fluid flow F as shown, i.e., in a direction that allows the fluid to first pass through the hoop 320. Within this disclosure, the axis X-X is horizontal, the axis Y-Y is vertical, and the fluid flow direction F will be orthogonal to the horizontal and vertical axes (FIGS. 2A and 2B).

Figure 3:
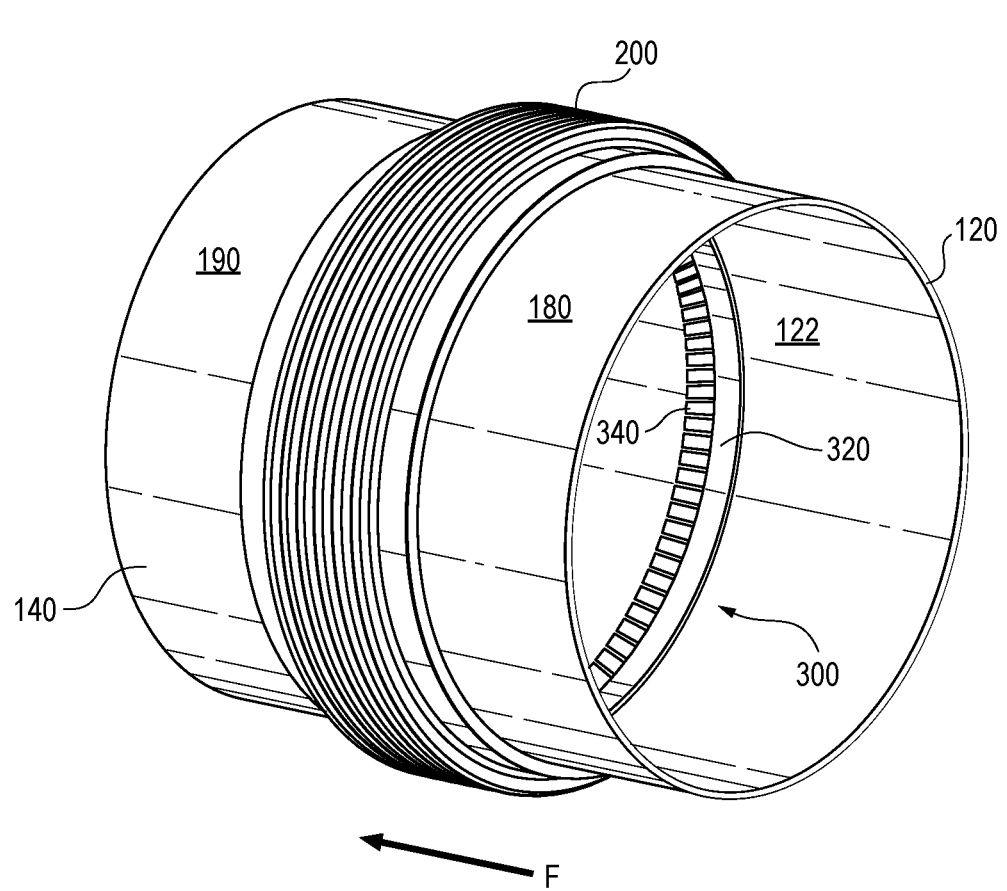
FIG. 3 is a perspective interior view of an exemplary embodiment of the vibration suppression system of the present disclosure that incorporates the device of FIGS. 2A and 2B.

Referring now to FIG. 3, the hoop 320 of the device 300 is shown affixed to and oriented within the first and second pipes 120 and 140. For purposes of placement of the device 300 within the pipes, the first pipe 120 may also be referenced as the upstream pipe, while the second pipe 140 may also be referenced as the downstream pipe. As such, it will be appreciated that the hoop 320 of the device 300 is installed on the interior wall 122 of the first pipe 120 as noted, and adjacent to the connection end 180 of the upstream pipe 120, as opposed to the connection end 190 of the downstream pipe 140. In this manner, the strakes 340 are oriented so as to extend downstream of the hoop 320.

Figure 4:
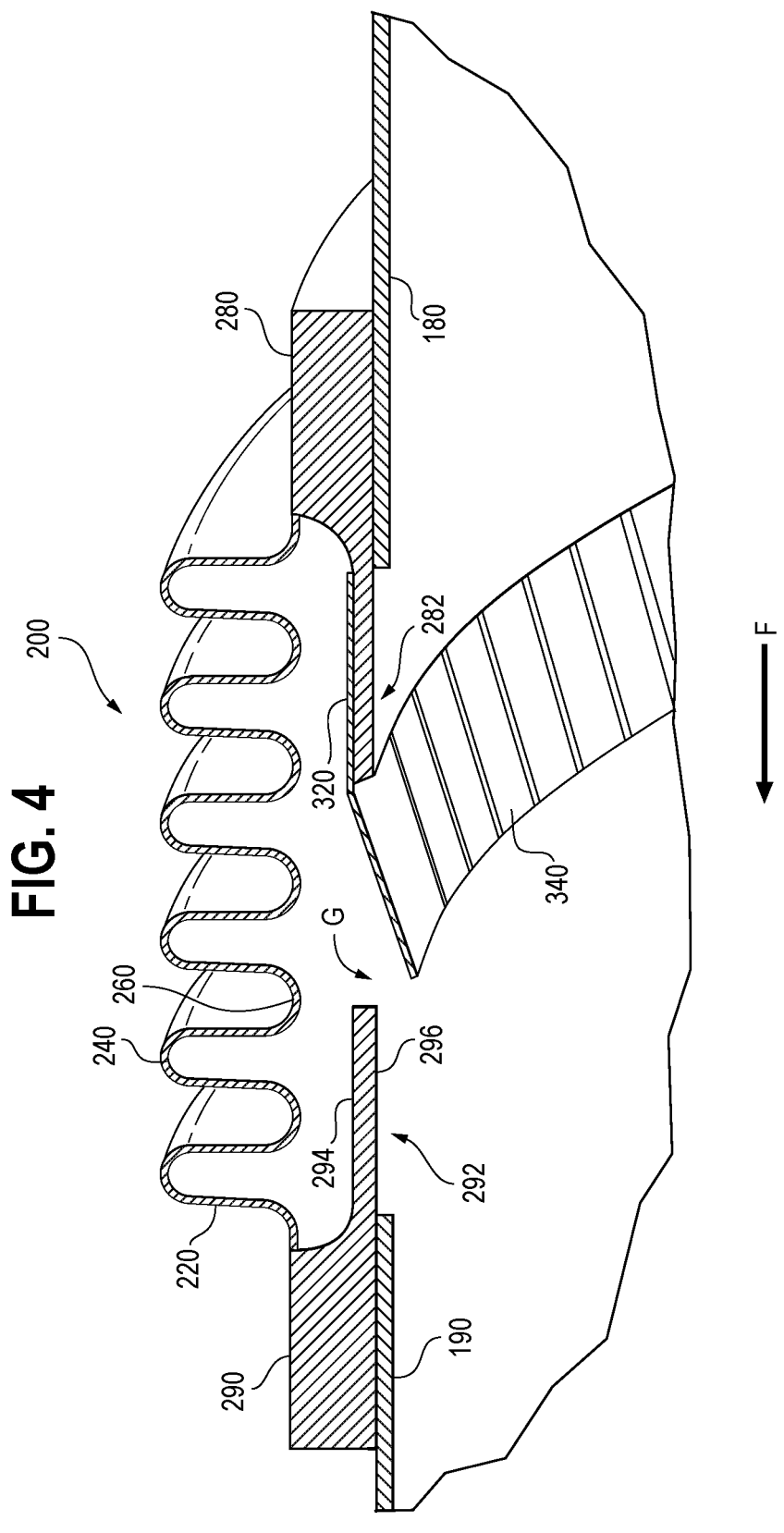
FIG. 4 is an enlarged perspective view of a portion of an exemplary embodiment of the vibration suppression system that may be fabricated in accordance with the present disclosure.

FIG. 4 is an enlarged view of a portion of an exemplary embodiment of this disclosure, which shows internal structures of the bellows 200. Thus, as a flexible joint, the bellows 200 provides flexible connective movement of otherwise axially fixed connection ends 180, 190 of the pipes 120, 140. The flexibility permits accordion-like movement of the bellows, allowing a full 360° angular range of movement. Thus, when any one side portion is compressed, the opposite side portion is expanded or stretched. To accommodate this action, the bellows 200 includes multiple undulations, herein called convolutions 220, each having a major diameter 240 and a minor diameter 260. The bellows 200 includes first and second pipe attachment ends 280 and 290 that can be brazed or otherwise directly bonded to the pipe connection ends 180 and 190, as is depicted in this embodiment. By comparison, in the embodiment of FIG. 1 the connection is shown to be achieved by clamps, although for sake of brevity only one clamp 160 is actually shown in FIG. 1.

Continuing reference to FIG. 4, the first pipe attachment end 280 contains an axially extending interior lip 282 onto which is secured a mounting ring, i.e., the hoop 320, of the vibration suppression device 300. Alternatively, as was depicted in the embodiment of FIG. 3, the hoop 320 can be brazed or bonded directly to the upstream pipe connection end 180. Similar to the interior lip 282 of the first pipe attachment end 280, it will be noted that the second pipe attachment end 290 also contains an axially extending interior lip 292, having a circumferentially extending outer surface 294, as well as a corresponding inner surface 296. The interior lip 282 of the first pipe attachment end 280 also contains outer and inner surfaces 294 and 296, respectively, although for the sake of clarity only the interior lip 292 is marked with the outer and inner surface references 294, 296. It can be noted that the interior lips 282 and 292 are axially spaced apart by a gap G. It will be apparent to those skilled in the art that the circumferential volume between the gap G and the bellows 200 defines a resonance chamber which gives rise to the noted vortex shedding that causes vibration.

As previously noted, both the hoop 320 and the strakes 340 can be formed of a unitary stamping from a thin metal plate. Alternatively, the hoop and the strakes may be separately formed and subsequently secured together by a metallic bonding method, such as brazing. For particularly harsh and/or corrosive environments, the metal can be formed of exotic and heat impervious metals, such as Inconel® (a nickel-chromium based alloy), aluminum alloys, and/or titanium alloys.

Figure 5A:
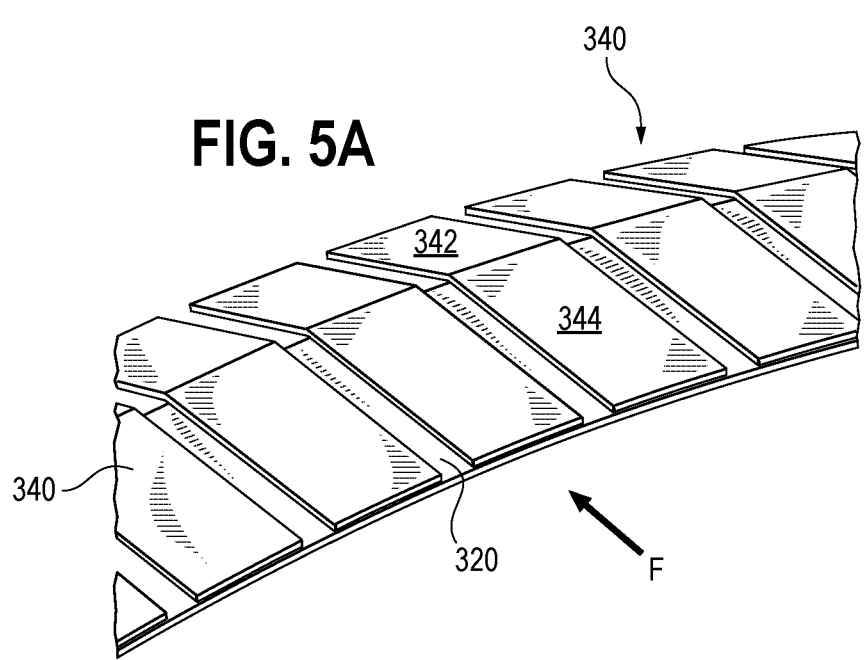
FIG. 5A is an enlarged perspective view of a portion of an alternate exemplary embodiment of a vibration suppression device.
Figure 5B:
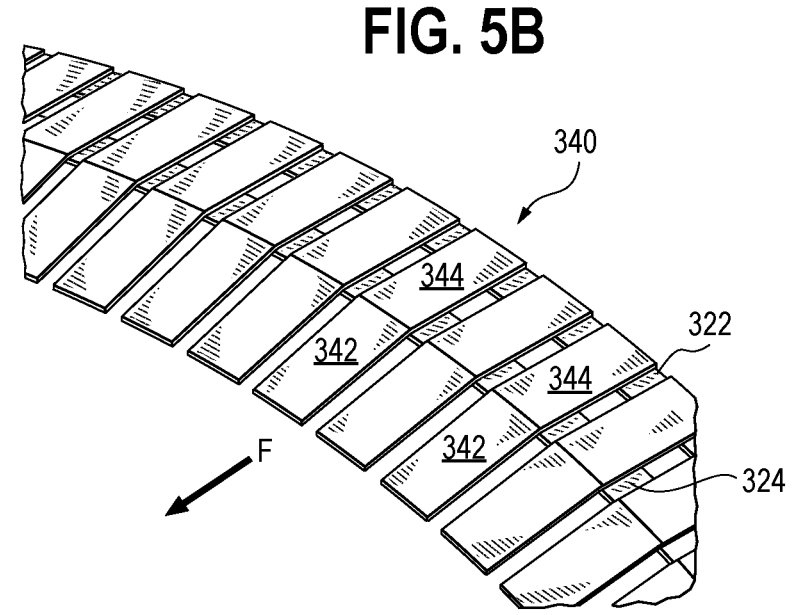
FIG. 5B is an enlarged perspective view of a portion of another alternate exemplary embodiment of a vibration suppression device.

FIGS. 5A and 5B demonstrate alternate exemplary embodiments of the hoop 320 and strakes 340. In FIG. 5A, the strakes 340 are elongated and fin shaped, but each strake includes an angled portion 342 and an axial portion 344. The portions 342 and 344 can be formed by stamping in a single die-forming operation. The axial portion is then bonded to the hoop 320, as described above, as just one example in cases where the strakes and the hoop are formed separately. In FIG. 5B, the angled portion 342 and the axial portion 344 can be formed in the same manner, but the axial portion of each strake 340 is then bonded, e.g., by brazing, to an axially spaced pair of hoops depicted as a first hoop 322 and a second hoop 324.

METHOD

Referring now to FIG. 6, an exemplary method for practicing this disclosure is presented by way of a sequence of boxes. Box 400 addresses a method of suppressing liquid flow-induced vibration within pipe systems having flexible bellows that connect first and second pipes, and with the first pipe positioned upstream of the second pipe.

Box 410 addresses conducting fluid dynamics modeling to determine hoop and strake criteria for mitigating liquid flow-induced vibrations, where hoop and strake elements are added as solution elements of the pipe and bellows system for suppressing vibration.

Box 420 addresses the forming of a circumferential hoop in accordance with modeling-determined criteria.

Box 430 addresses the forming and attachment of strakes to the hoop in accordance with the modeling-determined criteria, while box 440 addresses securing of the hoop to the interior wall of the first pipe at a location adjacent the bellows in accordance with the modeling-determined criteria.

EXAMPLE

Fluid dynamics modeling and analysis were conducted to design a hoop and strake system within a liquid fuel pipe system designed for thrust vectoring of rocket motors. In the modeled pipe system, the fuel was conveyed in predetermined 16-inch diameter pipes at cryogenic temperatures. Accordingly, the modeling elements included a bellows connecting two 16 inch diameter pipes. Fluid dynamics modeling addressed in this disclosure was conducted using LS-Dyna, a software program owned by Livermore Software Technology Corporation, headquartered in Livermore, California, and currently marketed by Ansys, Inc. of Canonsburg, Pennsylvania. Ansys also markets a comparable software called Fluent. A third known available fluid dynamics modeling option is Simcenter STAR-CCM+, a software owned by Siemens AG Corporation of Munich Germany.

A thrust vectoring pipe system was modeled, which assumed the following parameters fixed as constants:
a) System pipes were 16 inches in diameter;
b) Liquid fuel mass flow rate was 50 pounds/second;
c) Cryogenic temperature was-300 Fahrenheit; and
d) Rocket engine thrust vectoring was limited to 3 degrees.

The modeling analysis conducted established a 40% reduction in vibration at the interface of the upstream pipe and bellows. The modeling-determined criteria established the angle of the strakes relative to the interior wall of the upstream pipe at 10 to 30 degrees, a hoop thickness of 0.06", approximately 1 inch long strakes, and a spacing of 0.1 inch between the strakes.
Additional Considerations The spacing or gap between the strakes was derived through an iterative modeling analysis, which assured the strake orientation and spacing did not constrict or reduce liquid fuel flow targets. As such, each of the strake and hoop modeling-determined parameters were established using the above-described modeling analysis.

Since oxygen and hydrogen rocket fuels are maintained and pumped though fuel pipes at cryogenic temperatures, steel materials are not suitable, as even steel alloys will freeze and suffer stress fractures due to cold embrittlement. As such, Inconel®, aluminum alloys, and/or titanium alloys, are recommended for the manufacture of hoops and strakes that will be installed in rocket liquid fuel pipes.

Although only a few embodiments and one specific method have been described herein, this disclosure may admit to yet other variations and modifications neither described nor suggested. As such, there may be additional approaches for practicing this disclosure, as may be appreciated by those skilled in the art. Also, the modeling-determined criteria included strake length, strake-to-hoop angle, and strake spacing about the hoop, and the strakes were depicted herein as elongated and fin-shaped. It will be appreciated that other criteria, including additional shapes and dimensional parameters, may be suitable for practicing the embodiments of this disclosure, particularly in less harsh environments.
Applicability In addition to the variously described approaches for practicing the embodiments of this disclosure, those skilled in the art may appreciate that the disclosed device, system, and method may be utilized anywhere that liquids, including fuels, are pumped and/or otherwise conveyed through pipes or tubing involving flexible joints. Applicable environments beyond aerospace may well include automotive, energy, oil, and gas.

CLAUSES

Clause 1. A vibration suppression device for mitigating liquid flow-induced vibration within a first pipe connected to a second pipe by a flexible joint, the vibration suppression device comprising:
a circumferential hoop affixable to an interior wall of the first pipe, the first pipe positioned upstream of the second pipe; and
a plurality of strakes attached to the hoop, the strakes configured to extend axially downstream of the hoop, adjacent to the flexible joint, and angled radially inwardly from the interior wall of the first pipe.

Clause 2. The vibration suppression device of Clause 1, wherein the hoop and the strakes are formed of titanium alloy or Inconel®.

Clause 3. The vibration suppression device Clauses 1 or 2, wherein the strakes are bonded to the hoop by brazing.

Clause 4. The vibration suppression device of Clauses 1-3, wherein the strakes are configured to be oriented radially inwardly from the interior wall at an angle within a range of 10 to 30°.

Clause 5. The vibration suppression device of Clauses 1-4, wherein the hoop and strakes are separately formed, and wherein the strakes are bonded to the hoop by brazing.

Clause 6. The vibration suppression device of Clauses 1-5, wherein the device comprises a first hoop and a second hoop to which the strakes are attached.

Clause 7. The vibration suppression device of Clause 1-6, wherein both the first hoop and the second hoop are affixable to an interior wall of the first pipe.

Clause 8. The vibration suppression device of Clause 1-7, wherein the circumferential spacing between strakes is derived through an iterative modeling analysis.

Clause 9. The vibration suppression device of Clause 1-8, wherein the strakes are fin-shaped, and are configured to be spaced about the hoop.

Clause 10. The vibration suppression device of Clause 1-9, wherein the hoop and strakes are formed by stamping.

Clause 11. A vibration suppression system for reducing liquid flow-induced vibration, the vibration suppression system comprising:
a first pipe, a second pipe, and a flexible joint, the flexible joint connecting the first and the second pipe for liquid flow from the first pipe through the flexible joint and into the second pipe, wherein the first pipe is positioned upstream of the flexible joint;
a circumferential hoop affixed to an interior wall of the first pipe adjacent to the flexible joint; and
a plurality of strakes attached to the hoop, the strakes extending downstream of the hoop, and oriented radially inwardly from the interior wall of the first pipe.

Clause 12. The vibration suppression system of Clause 11, wherein each of the first pipe and the second pipe has a connection end, and wherein the flexible joint is a bellows secured to each connection end by a clamp.

Clause 13. The vibration suppression system of Clause 11 or 12, wherein the bellows is formed of either an Inconel® or of a titanium alloy.

Clause 14. The vibration suppression system of Clause 11-13, wherein the strakes are fin-shaped, and are oriented radially inwardly from the interior wall at an angle having a range of 10 to 30°.

Clause 15. The vibration suppression system of Clause 11-14, wherein the hoop and the strakes are formed of a titanium alloy stamping.

Clause 16. The vibration suppression system of Clause 11-15, wherein the hoop and the strakes are secured together by brazing.

Clause 17. The vibration suppression system of Clause 11-16, wherein the bellows has a first pipe attachment end and a second pipe attachment end, and wherein each attachment end has an interior lip radially under convolutions of the bellows.

Clause 18. The vibration suppression system of Clause 11-17, wherein the hoop is brazed to an outer surface of one interior lip.

Clause 19. A method of suppressing liquid flow-induced vibration within at least a first pipe, a second pipe, and a bellows connecting the first pipe to the second pipe; the method comprising:

conducting fluid dynamics modeling of the first pipe and second pipe, each having a predetermined diameter, the first pipe being configured to flow liquid through the bellows and into the second pipe, wherein modeling elements include a hoop and a plurality of strakes attached to the hoop for determining optimal hoop and strake criteria to mitigate liquid flow-induced vibrations within the first pipe, the second pipe, and the bellows;

forming a hoop in accordance with modeling-determined criteria, including hoop thickness;

forming and attaching a plurality of modeling-determined geometrically sized and angled strakes to the hoop; and securing the hoop to an interior wall of the first pipe in a location adjacent to and upstream of the bellows, in accordance with modeling-determined criteria.

Clause 20. The method of Clause 19, wherein the hoop is secured to the interior wall by brazing.

What is claimed is:

1. A vibration suppression device for mitigating liquid flow-induced vibration within a first pipe connected to a second pipe by a flexible joint, the vibration suppression device comprising:

a circumferential hoop affixed to an interior wall of the first pipe, the first pipe positioned upstream of the second pipe, wherein the circumferential hoop is affixed to the interior wall of the first pipe, at an interface of the first pipe and the second pipe, and wherein the first pipe and the second pipe are separate pipes connected by the flexible joint; and a plurality of strakes attached to the circumferential hoop, the plurality of strakes configured to extend axially downstream of the circumferential hoop, adjacent to the flexible joint, and angled radially inwardly from the interior wall of the first pipe.

2. The vibration suppression device of claim 1, wherein the circumferential hoop and the plurality of strakes are formed of titanium alloy or a nickel-chromium based alloy.

3. The vibration suppression device claim 1, wherein the plurality of strakes are bonded to the circumferential hoop by brazing.

4. The vibration suppression device of claim 1, wherein the plurality of strakes are configured to be oriented radially inwardly from the interior wall at an angle within a range of 10 to 30°.

5. The vibration suppression device of claim 1, wherein the circumferential hoop and the plurality of strakes are separately formed, and wherein the plurality of strakes are bonded to the circumferential hoop by brazing.

6. The vibration suppression device of claim 1, wherein the circumferential hoop comprises a first hoop and a second hoop to which the plurality of strakes are attached.

7. The vibration suppression device of claim 6, wherein both the first hoop and the second hoop are affixable to the interior wall.

8. The vibration suppression device of claim 1, wherein the circumferential spacing between the plurality of strakes is derived through an iterative modeling analysis.

9. The vibration suppression device of claim 1, wherein the plurality of strakes are fin-shaped, and are configured to be spaced about the circumferential hoop.

10. The vibration suppression device of claim 1, wherein the circumferential hoop and the plurality of strakes are formed by stamping.

11. A vibration suppression system for reducing liquid flow-induced vibration, the vibration suppression system comprising:

a first pipe, a second pipe, and a flexible joint, the flexible joint connecting the first pipe and the second pipe for liquid flow from the first pipe through the flexible joint and into the second pipe, wherein the first pipe is positioned upstream of the flexible joint, wherein the first pipe and the second pipe are separate pipes;

a circumferential hoop affixed to an interior wall of the first pipe adjacent to the flexible joint, wherein the circumferential hoop is affixed to the interior wall of the first pipe, at an interface of the first pipe and the second pipe; and a plurality of strakes attached to the circumferential hoop, the plurality of strakes extending downstream of the circumferential hoop, and oriented radially inwardly from the interior wall of the first pipe.

12. The vibration suppression system of claim 11, wherein each of the first pipe and the second pipe has a connection end, and wherein the flexible joint is a bellows secured to each connection end by a clamp.

13. The vibration suppression system of claim 12, wherein the bellows is formed of either a nickel-chromium based alloy or of a titanium alloy.

14. The vibration suppression system of claim 12, wherein the plurality of strakes are fin-shaped, and are oriented radially inwardly from the interior wall at an angle having a range of 10 to 30°.

15. The vibration suppression system of claim 11, wherein the circumferential hoop and the plurality of strakes are formed of a titanium alloy stamping.

16. The vibration suppression system of claim 15, wherein the circumferential hoop and the plurality of strakes are secured together by brazing.

17. The vibration suppression system of claim 12, wherein the bellows has a first pipe attachment end and a second pipe attachment end, and wherein each attachment end has an interior lip radially under convolutions of the bellows.

18. The vibration suppression system of claim 17, wherein the circumferential hoop is brazed to an outer surface of one interior lip that is part of the interior of the first pipe.

19. A method, comprising:

mitigating, by a vibration suppression device, liquid flow-induced vibration within a first pipe connected to a second pipe by a flexible joint, wherein the first pipe and the second pipe are separate pipes, and wherein the vibration suppression device comprises:

a circumferential hoop affixed to an interior wall of the first pipe, the first pipe positioned upstream of the second pipe, wherein the circumferential hoop is affixed to the interior wall of the first pipe, at an interface of the first pipe and the second pipe; and a plurality of strakes attached to the circumferential hoop, the plurality of strakes configured to extend axially downstream of the circumferential hoop, adjacent to the flexible joint, and angled radially inwardly from the interior wall of the first pipe.

20. The method of claim 19, wherein the flexible joint connects the first pipe and the second pipe for liquid flow from the first pipe through the flexible joint and into the second pipe.

21. A method of suppressing liquid flow-induced vibration within at least a first pipe, a second pipe, and a bellows connecting the first pipe to the second pipe; the method comprising:

conducting fluid dynamics modeling of the first pipe and second pipe, each having a predetermined diameter, the first pipe being configured to flow liquid through the bellows and into the second pipe, wherein the bellows is flexible, wherein modeling elements include a hoop and a plurality of strakes attached to the hoop for determining optimal hoop and strake criteria to mitigate liquid flow-induced vibrations within the first pipe, the second pipe, and the bellows, wherein the first pipe and the second pipe are separate pipes;

forming a hoop in accordance with modeling-determined criteria, including hoop thickness;

forming and attaching a plurality of modeling-determined geometrically sized and angled strakes to the hoop, wherein the strakes are configured to extend axially downstream of the hoop, adjacent to the flexible joint, and angled radially inwardly from an interior wall of the first pipe; and securing the hoop to the interior wall of the first pipe in a location adjacent to and upstream of the bellows, in accordance with modeling-determined criteria, wherein the hoop is secured at an interface of the first pipe and the second pipe, and wherein the first pipe is positioned upstream of the second pipe.

22. The method of claim 21, wherein the hoop is secured to the interior wall by brazing.

* * * * *